Oct. 26, 1926.  
L. A. WALKER ET AL  
1,604,507  
DIRIGIBLE HEADLIGHT  
Filed April 8, 1925

Inventors  
L. A. Walker  
J. A. Walker  
By D. Swift  
Attorney

Patented Oct. 26, 1926.

1,604,507

UNITED STATES PATENT OFFICE.

LOUIS A. WALKER AND JAMES A. WALKER, OF DUNLAP, TENNESSEE.

DIRIGIBLE HEADLIGHT.

Application filed April 8, 1925. Serial No. 21,581.

The invention relates to dirigible headlights, and has for its object to provide a device of this character which is supported on a connecting rod between the lamps of automobiles and has for its object to mount a dirigible spotlight on said rod forwardly of the radiator, and to provide means whereby said spotlight may be universally moved for projecting light rays to either side of the vehicle on the road-way or in any direction in a vertical plane.

A further object is to provide the lamp connecting rod with brackets, in bearings of which is rotatably mounted a shaft, the ends of which shaft terminate in angularly disposed arms, one of which arms extends upwardly and has rotatably connected thereto a rearwardly extending control rod, and by means of which rod the shaft may be rocked. The control rod forwardly of its connection to the upwardly extending member is provided with an angularly disposed arm connected to a pivotally mounted spotlight carried by the other arm of the rotatable shaft through the medium of a connecting rod having ball and socket joints at its ends.

A further object is to provide means for frictionally holding the control rod in any position to which it may be moved.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1:
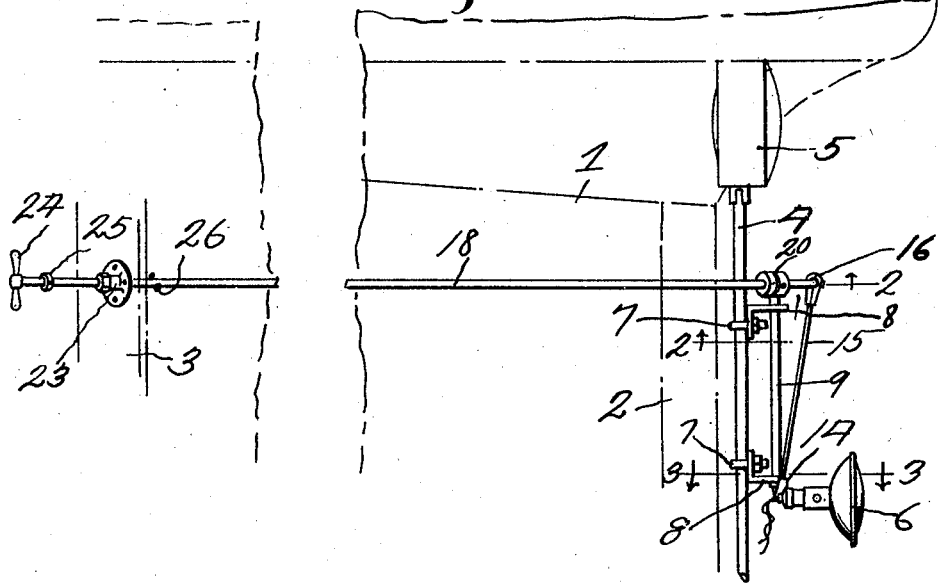
Figure 1 is a top plan view of the spotlight mechanism.
Figure 2:
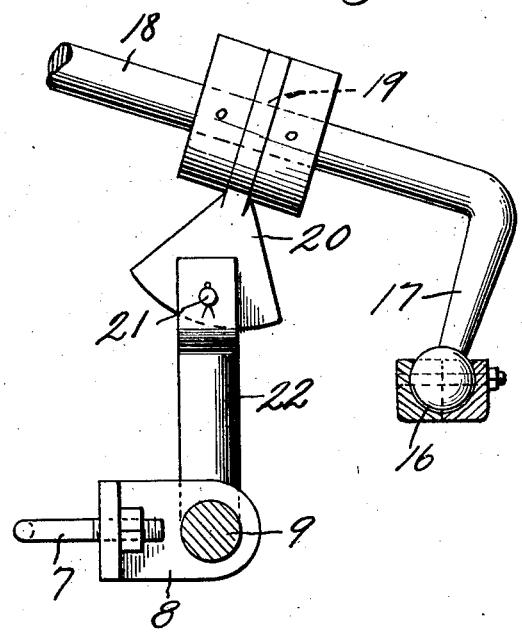
Figure 2 is a vertical transverse sectional view taken on line 2—2 of Figure 1.
Figure 3:
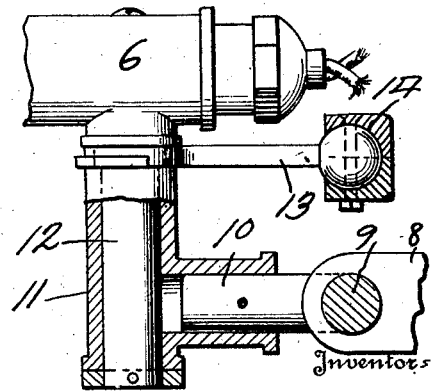
Figure 3 is a vertical transverse sectional view taken on line 3—3 of Figure 1.

Referring to the drawing the numeral 1 designates the forward end of an automobile, 2 the radiator thereof and 3 the instrument board. Extending transversely of the automobile in front of the radiator 2 is a horizontally disposed rod 4 which connects lamps 5 together in the usual manner. Spotlights at present are mounted on various parts of the automobile, for instance to one side of the windshield, or through the windshield glass, however these constructions have been found to entail many difficulties, for instance the light beams being too close to the operator's eyes, or in positions where the light rays can not be projected to either side of the roadway, or upwardly or downwardly. To obviate this difficulty the spotlight 6 is mounted on the connecting rod 4 forwardly of the radiator 2, in a position remote from the operator's eyes and whose eyes are shielded by the radiator. Secured to the connecting rod 4 by means of U-bolts 7 are angularly shaped brackets 8, and in which brackets is rockably mounted a transversely disposed shaft 9, one end of which is provided with a substantially horizontally disposed forwardly extending arm 10, to the outer end of which is secured a T-shaped fitting 11. Rotatably mounted in the fitting 11 is a vertically disposed lamp post 12 to the upper end of which is secured the spotlight 6. It will be seen that the spotlight 6 may move in a horizontal plane pivotally in the fitting 11, and in a vertical plane when the rock shaft 9 is rocked in the bearings of the brackets 8, therefore it will be seen that the spotlight 6 is substantially universally movable for projecting light rays in any angle in a vertical plane, as well as a horizontal plane, or at inclines. Secured to the lamp post 12 is a rearwardly extending arm 13 to the rear end of which is connected by means of a universal joint 14 a transversely disposed rod 15, and which rod has its other end provided with a universal connection 16 to a downwardly extending arm 17 of a rearwardly extending operating rod 18, therefore it will be seen that when the rod 18 is rotated in the bearing 19 of the pivoted bracket 20, the spotlight 6 will be moved in a horizontal plane for projecting light rays on any part of the roadway ahead of the automobile or to the sides of the roadway. Pivoted bracket 20 is pivotally connected at 21 to an upwardly extending arm carried by the rock shaft 9, therefor it will be seen that when an axial movement is imparted to the control rod 18, the bracket 20 which is pivotally connected to the arm 22 will cause the rock shaft 9 to rock, either upwardly or downwardly according to the direction of axial movement of the control rod 18, therefore it will be seen that the spotlight 6 may be moved upwardly or downwardly in a vertical plane, and the operator within the automobile may control the spotlight for projecting light rays in any direction.

The rear end of the control rod 18 extends through a packing box 23 which frictionally holds the rod in any position to which it may be moved, therefore it will not be necessary to maintain his hand on the handle 24 after an adjustment of the rod 18. Rod 18 is provided with an adjustable collar 25 which may be moved to various positions for limiting the amount of movement of the rod 18 to prevent the movement of the spotlight to extreme position. The rod is also provided with a pin 26 which limits the movement of the rod 18 in one direction.

From the above it will be seen that a dirigible spotlight mechanism is provided, which is constructed in a manner whereby the spotlight may be controlled from adjacent the operator's seat and the spotlight located forwardly of the radiator. The control rod 18 extends rearwardly through the radiator in any suitable manner, or the radiator casing if desired. It will be seen the device is simple in construction, positive in operation and may be easily and quickly applied to an automobile without materially varying the structure thereof.

The invention having been set forth what is claimed as new and useful is:—

The combination with a lamp connecting rod of an automobile, of a dirigible spotlight, said spotlight being mounted on a horizontally disposed forwardly extending arm, said arm being carried by a horizontally and transversely disposed rock shaft supported by the connecting rod, said rock shaft being provided with an upwardly extending arm, a bracket pivotally connected to the upwardly extending arm and movable in a vertical longitudinal plane, a forwardly and downwardly inclined control rod rockably mounted in a bearing of said pivoted bracket, said control rod being provided with a downwardly extending arm forwardly of and in the plane of the upwardly extending arm, a rearwardly extending arm carried by the spotlight above the forwardly extending arm and a connecting rod connecting the downwardly extending arm of the control rod and the arm carried by the spotlight and universally connected thereto.

In testimony whereof we affix our signatures.

LOUIS A. WALKER.
JAMES A. WALKER.